United States Patent [19]

Silver

[11] Patent Number: 5,066,218
[45] Date of Patent: Nov. 19, 1991

[54] COMPOSITION OF A STEEPED STARCHED-CONTAINING GRAIN AND A CELLULASE ENZYME

[75] Inventor: Scott C. Silver, Belmont, Calif.

[73] Assignee: Genencor International, Inc.

[21] Appl. No.: 675,013

[22] Filed: Mar. 22, 1991

Related U.S. Application Data

[60] Continuation of Ser. No. 248,001, Sep. 22, 1988, abandoned, which is a division of Ser. No. 49,750, May 13, 1987, abandoned.

[51] Int. Cl.$^5$ .......................... A21D 2/00; A21D 8/02
[52] U.S. Cl. ........................ 426/20; 127/37; 127/68; 426/507; 435/188; 241/21
[58] Field of Search ............... 127/37, 68; 426/18, 426/20, 331, 463, 482, 507, 622; 435/188, 94, 136, 96, 151, 99; 241/21, 301

[56] References Cited

U.S. PATENT DOCUMENTS

| | | |
|---|---|---|
| 3,928,631 | 12/1975 | Freeman et al. ............... 127/68 X |
| 4,414,330 | 11/1983 | Zucker et al. .................. 127/38 X |
| 4,435,429 | 3/1984 | Burrows et al. ............... 426/482 X |
| 4,710,386 | 12/1987 | Fulger et al. .................... 426/28 |
| 4,857,339 | 8/1989 | Maselli et al. .................. 426/28 |
| 4,859,474 | 8/1989 | Neidleman et al. ............. 426/28 |

Primary Examiner—Timothy V. Eley
Attorney, Agent, or Firm—James G. Passé

[57] ABSTRACT

The invention relates to a method of milling grain, especially corn, comprising cleaning the grain, steeping the grain in water to soften it, and then milling the grain with a cellulase enzyme.

1 Claim, 2 Drawing Sheets

COMPOSITION OF A STEEPED STARCHED-CONTAINING GRAIN AND A CELLULASE ENZYME

This is a continuation of application Ser. No. 248,001 filed 09/22/88, which is a division of application Ser. No. 049,750, filed May 13, 1987.

FIELD OF THE INVENTION

The present invention relates to a novel method of wet milling grain with a cellulase enzyme to produce starch. More particularly, the invention relates to a method wherein cellulase is added to the milling step in the separation of starch from grains such as corn.

BACKGROUND INFORMATION

Grains such as corn have long been used as a source of starch. One of the classic methods of separating starch and other components from grain is the wet milling process. This method is a highly specific and integrated system developed to separate the major components of the kernel as completely as possible (see Stanley A. Watson, *Starch: Chemistry & Technology*, Vol. II, *Industrial Aspects*, Academic Press, New York. 1967 pgs. 30-51. While the process in commercial practice is essentially a continuous one, it is convenient to break the process down into general component steps. The first step in the wet milling process is the preparation of the grain kernel by cleaning. The grain is screened to remove all large and small pieces of chaff, sand and other undesirable foreign material. Rust and light chaff are removed by aspiration. The next step in the wet milling of grain is the steeping. The grain must be softened by a steeping process to produce optimum separation of components Steeping, however, is more than just soaking in water. It involves maintaining the correct balance of water flow, temperature, sulfur dioxide concentration, and an adequate population of lactic acid bacteria. It may also include a number of sequential soaks under various conditions. Grain is placed in a steep tank and steep water (usually drained mill water or other process water) is added along with desired additives. Steep water will cascade from tank to tank from oldest corn to progressively less steeped corn. At the end of the steep, the corn is removed from the tank, new corn added and the process is repeated. Corn, for example is normally steeped 30 to 50 hours at a temperature of 48° to 52° C. By the end of the steeping period, the corn should have a) absorbed water up to about 45% on a wet basis, b) released about 6.0%-6.5% of its dry substance or solubles into the steep water; c) absorbed about 0.2 to 0.4 of sulfur dioxide per kilogram; and d) become sufficiently soft to yield when squeezed between the fingers (see Watson et al., *Cereal Chem.*, Vol. 28, pg 105 (1951)). After this step essentially all of the steep water is separated from the steeped corn.

The final step is the wet milling and fraction separation which is designed to provide as complete a separation of the component parts of the kernel as possible and practical. The drained grain is added to a mill, along with process water. This milling step may actually comprise a plurality of grinding steps, such as an initial cracking step or coarse grinding to remove the germ followed by one or more increasingly finer grinds to remove additional components. These are essentially continuous grinds with water and grain constantly being added and constantly removed from each mill. In between grinds, the components can be separated by screening or washing. The removal of starch in the milling process is such that it must be separated from the fiber. Starch is normally separated with a combination of screens, centrifuges and wash water. It is often the case that the used wash water or process water is then recycled for use as the steep liquid.

In spite of this complicated extraction procedure a percentage (around 2 to 6%) of the starch remains bound to the fiber, which is normally never recovered. This represents from about 20% to 60% of the weight of the fiber.

It has been known for some time that addition of cellulase could be beneficially added to the steep liquid (see R. Takahashi, T. Ojima, and K. Yoshimura, "Cereal Starch Production Using Cellulase," *J. Ferment Technol.*, Vol. 44, No. 11, pgs. 842-846 (1966) 5-14 liters/ton with no mention of activity. See also Malmos, *AIChE*, No. 172, Vol. 74, pg. 95, (1978)), to increase starch yield or shorten processing time. As discussed in the prior art, the normal dosage added to steep liquid is around 0.1 to 0.2 liters per ton of grain. No mention of relative activity is discussed, however, which may account for the wide variety of results in the prior art. The steep liquid containing the unused or inactivated enzyme is usually extracted for solids or used as animal or nutrient feed. However, because of the high content of $SO_2$ (about 2000 ppm) at the beginning of the steeping process, which creates a low pH and may inactivate the enzyme, it is usually recommended that no enzyme be added to the steep liquid until the $SO_2$ content reaches 500 ppm or the pH is up around 4-4.5. (see e.g. Finn-Sugar sales literature for Spezyme CE brand cellulase, see also Takahashi, J. Ferment Tech. 44 (11), pg 842-846 (1966)). This creates a problem. Because a number of tanks are used for sequential steeping, the actual tank to which enzyme must be added constantly changes. It is time consuming, complicated and expensive to continually move equipment and measure $SO^2$ levels to meet these constant changes. Further, practical results outside of the laboratory for this process have not been demonstrated with any reliability. It appears that the enzyme does not actually penetrate the outer hull during steeping and as such does little to separate components. Cellulase appears to only work on inner layers and soluble glucans. Some positive results in the prior art for steeping can probably be explained because the prior art has added cellulase to preground grain in the steep tank rather than whole grain as actually practiced commercially, thus giving the cellulase access to the inner layers. In practice, however, unsteeped grain is never ground except in dry milling process. The grinding of unsteeped grain would decrease the recovery of the lighter components such as the germ. Further, it appears that steeping experiments have only been conducted on laboratory scale.

Accordingly, it would be advantageous to have a method of wet milling which overcomes the need to measure pH or $SO_2$ concentration, requires less equipment or labor and be less complicated, yet still achieve increased separation of starch and other grain components. It would further be advantageous to be able to decrease the steep time without deleterious effect upon the separation products.

SUMMARY OF THE INVENTION

The invention of Applicant overcomes the difficulties of the prior art. Namely, when using cellulase enzyme to improve separation of components from grain, including starch and proteins from grain and grain fiber without deleterious effects to the milling process or products, a method has been discovered which overcomes the need to measure PH and $SO_2$ concentration, the need for additional equipment movement or labor and the need for complicated procedures for addition of enzyme. The invention further allows one to decrease the normal steep times while obtaining the same amount of separation of products, and accomplishing similar or even improved milling tonnage per unit time. Further, it has been discovered that invention allows cellulase enzyme to penetrate the grain to a greater degree than achieved by the prior art.

Applicant's invention relates to a method of wet milling a starch-containing grain comprising:
a) selecting a starch-containing grain;
b) steeping the grain in water until the desired:
 1) amount of water absorbed
 2) amount of dry substance released into the steep water; and/or
 3) softness of the grain; is achieved;
c) removing the steep water from the grain; and
d) adding to the steeped grain, a cellulase enzyme in the amount of from at least about 5000 F.P.U./ton of steeped grain. F.P.U. (Filter Paper Units) is the standard measure of activity for cellulase enzymes.

Applicant also claims a novel composition, namely a composition comprising steeped starch-containing grain to which a cellulase enzyme has been added in an amount from at least about 5000 F.P.U./ton of steeped grain.

DETAILED DESCRIPTION OF THE INVENTION

Figure 1:
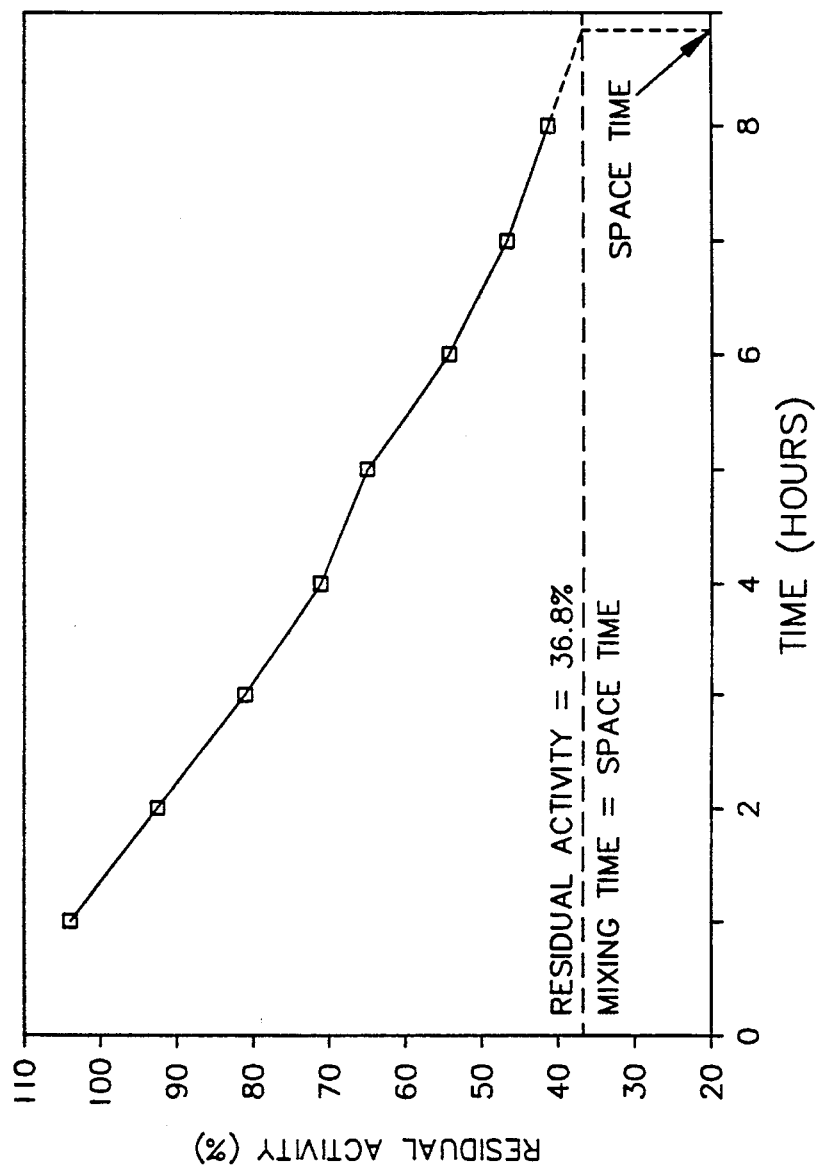
Figure 2:
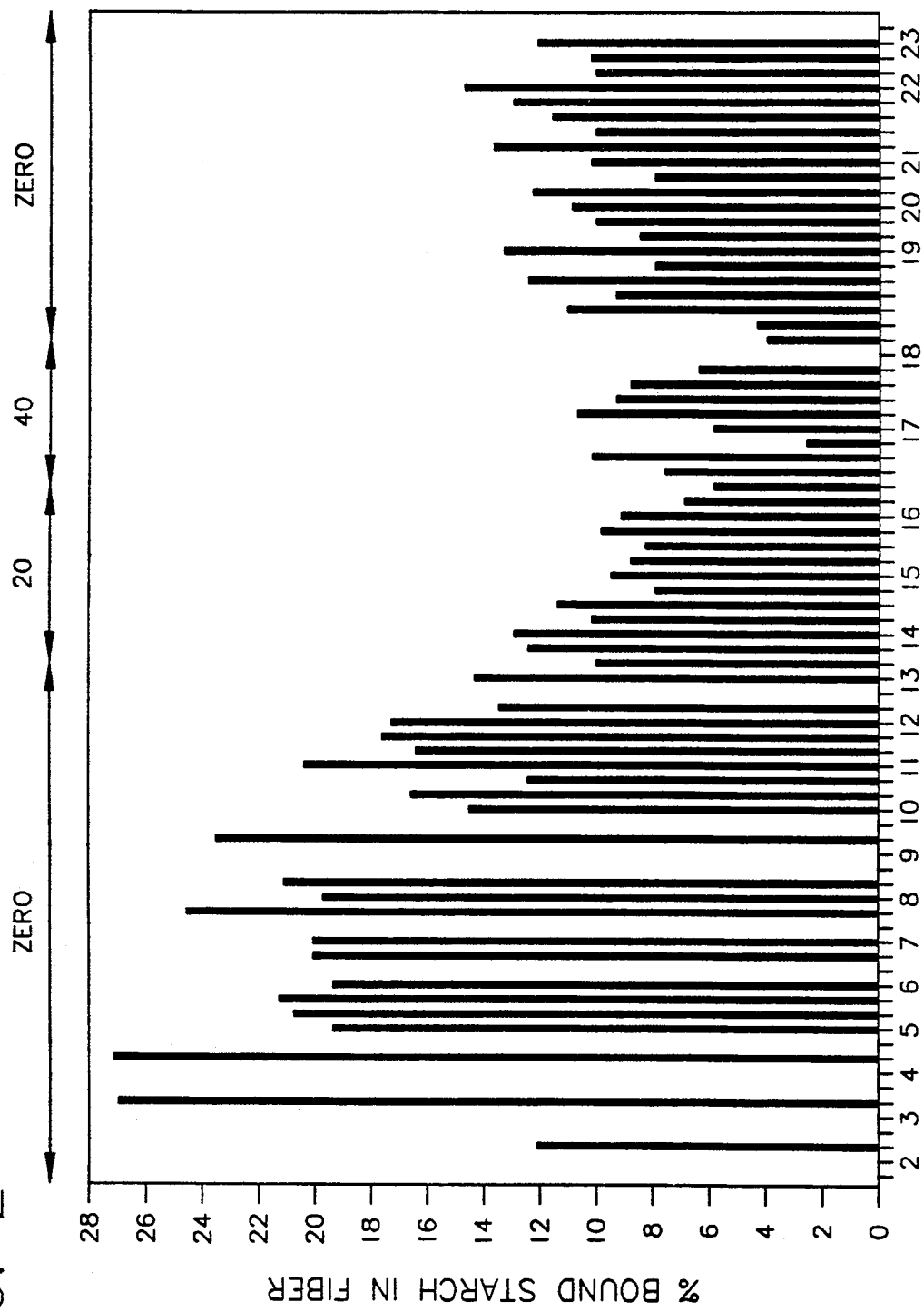

It has been discovered that when a cellulase enzyme is added to already steeped grain before, during or after the milling of grain instead of during the steeping step, an increase is achieved in the amount of starch which is removed, previously bound to the fiber. When added to the mill, the enzyme penetrates the grain fiber to a much greater extent than when enzyme is added to the steep water. Also, since mill water is often back-flowed into the steep tanks, any remaining active enzyme in the mill water will end up available in the steep water. As much as 70%, or more of the original enzyme may find its way to the steep water by this mechanism. Further, it has been discovered that the daily grind can be increased. Even further, it was discovered that the steep time could be decreased without deleterious effects on the process or products produced or yield of products.

As used herein, "starch-containing grain" is any of the various edible grains which are or can be used as a source of isolated starch. Examples include corn, wheat, milo, and the like.

As used herein, "steeping" refers to the water soakings that starch-containing grains receive prior to wet milling to remove the starch proteins and other components, as previously described herein. In the normal process, steep water is obtained from the water used in the milling step or other process water to which $SO_2$ has been added, up to around 1500 to about 2,000 ppm. This steeping is usually accomplished in a number of successive soakings with the water cascading back to corn which has seen less steeping. The grain remains in one tank during the successive soakings until finished steeping, the tank is unloaded and fresh grain will be added to the tank. As such, the tank which constitutes the first in line constantly rotates. A complex set of pipes and valves usually regulates the water flow. Because the water used from steeping is obtained from the milling, unused enzyme added to the mill will move to the steep water as well. As much as 70% of the original enzyme may be available in the steep water using the method of this invention.

As used herein, "cellulase enzymes" refers to those enzymes capable of degrading cellulose, including cellulase and hemicellulase enzymes. These enzymes are isolated from for example, growths of Tricoderma or Aspergillus organisms such as *Tricoderma reesei* or *Aspergillus niger*.

The hydrolysis of cellulose and other biomass components is achieved by the action of cellulases. (See T. M. Wood and S. I. McCrea, "The Mechanism of Cellulase Action with Particular Reference to the $C_1$ Component," *Proceedings of Bioconversion of Cellulosic Substances Into Energy, Chemicals and Microbial Protein*, T. K. Ghose, ed., Thompson Press (India). Ltd., Fariadabad, Haryana, India (1978), pp. 111–41.

The cellulase system of *Trichoderma reesei* (wild strain QM6a and derivatives thereof) is capable of efficiently degrading crystalline cellulose to glucose. That system consists of three different hydrolytic enzymes, endoglucanases (endo-1,4-a-D glucanase EC 3.2.1.4) which attack cellulose derivatives carboxymethyl cellulose and amorphous cellulose, exoglucanases typified in *Trichoderma reesei* by cellobiohydrolase (1,4-a-D glucancellobiohydrolase EC 3.2.1.91) and cellobiase (EC 3 2.1.21). Within the above three enzyme groupings, five to eight electrophoretically distinct endoglucanases have been described (see V. Farkas, A. Jalanko and N. Kolarova, "Characterization of Cellulase Complexes From *Trichoderma reesei* QM9414 and Its Mutants by Means of Analytical Isoelectricofocusing in Polyacrylamide Gels," *Biochem. Biophys. Acta.*, 706:105–110 (1982)); these include two immunologically distinct cellobiohydrolases (CBH I and CBH II) (see L. G. Fagerstam and L. G. Pettersson, "The 1,4-a-glucan Cellobiohydrolases of *Trichoderma reesei* QM9414: A new Type of Cellulolytic Synergism," *FEBS Letters* 119:97–100 (1980)., L. G. Fagerstam and L. G. Pettersson, "The Cellulolytic Complex of *Trichoderma reesei* QM9414: An Immunochemical Approach," *FEBS Letters* 98:363–67 (1979)), and three cellobiases (C. S. Gong, M. R. Ladisch and G. T. Tsao, "Cellobiase From *Trichoderma viride*: Purification, Properties, Kinetics and Mechanism," *Biotechnology Bioengineering*, XIX:9-59–98 (1977)).

The preferred cellulase of the invention is that cellulase isolated from *Trichoderma reesei* RL-P37, or NRRL No. 15709 which is available as a biologically pure culture from the permanent collection of the Northern Regional Research Laboratory. U.S. Department of Agriculture, Peoria, Ill., U.S.A. It is also contemplated that other modified (such as changes in amino acid sequence) or recombinant DNA produced cellulases could be added which vary activity, stability and the like as a part of this invention.

When adding enzyme to the steeped grain one can select a cellulase or mixture of cellulase enzymes for addition. The cellulase enzyme should be in an amount of at least about 5000 F.P.U./ton of grain, preferably from about 5000 F.P.U. to about 60,000 F.P.U./ton of grain, and more preferably from about 5000 F.P.U. to about 30,000 F.P.U./ton of grain. A given sample may be more or less concentrated than another in terms of activity, volume, etc., but standardization of dosage can be achieved by this measurement. A standard F.P.U. measurement test is described in M. Mandels, R. Andreotti, & C. Roche, *Biotech. Bioeng. Symp.*, No. 6, pg. 21, (1976). The enzyme may be added continuously or in batches to steeped grain prior, during or after any one of the several grinds that comprise the milling step, but prior to the desired separation step. For example, the enzyme can be added to the process prior to one of the final fine grinds. It is preferred, however, that the enzyme be added with the process water prior to or during the first coarse grind or cracking step to ensure maximum effect in the milling process. The enzyme can be added continuously to the operating mill during continuous grain addition. While the enzyme can be added to the mill tank all at once, it is preferable that the enzyme be added in a continuous manner to coincide with continuous addition and removal of grain. This is normally achieved by addition with the process water which is also continuously added. After the milling, starch, protein and other components can be separated by methods known in the art.

The following examples are by way of illustration only and are not intended to be limiting. One skilled in the art would be capable of selecting enzymes, concentrations, processing conditions, different milling steps, etc., based on the teachings herein without undue experimentation.

DESCRIPTION OF THE PREFERRED EMBODIMENTS

I. Enzyme Added to Steep

Corn (50 g) was soaked for 5 hours at 50° C. in samples of steep liquor from each steep tank (100 ml) with 0.1 ml of added Genencor ® Cellulase 150L. Sulfur dioxide levels were in the range of 164 to 794 ppm. A buffer control was also tested. Residual enzyme activity was measured after incubation. Data shows that enzyme activity was not destroyed as a function of sulfur dioxide concentration. Surprisingly, enzyme activities were uniformly increased by this treatment. Volumes of steep liquor remaining after incubation were measured. All samples contained approximately 70 ml of free liquid after incubation. If the original enzyme concentration is multiplied by the factor 100/70 (original liquid volume/final liquid volume) the anticipated activity, assuming no losses, becomes 143, exactly the value measured. These data suggest that the enzyme is not taken up by the corn when water is inbibed.

II. Initial Water/Enzyme Uptake with Added Cellulase

The uptake of water and enzyme during steeping was measured periodically during the first two hours of contact. Corn steep liquor (164 ppm $SO_2$) and cellulase enzyme were incubated as previously described. Residual enzyme activity and volume of free liquid were measured every 30 minutes. Apparent enzyme activity increases as water is taken up by the corn. The mathematical product (activity * liquid volume) is essentially constant, confirming the hypothesis that enzyme is not taken up by the corn.

III. Action of Cellulase on Corn Fiber

Cellulase was ineffective in causing significant degradation of corn fiber. It was, however, desirable to demonstrate at least some action upon this substrate. The following experiments show differences in corn steeped with and without enzyme using organic dyes.

Corn fiber from the press was washed, boiled with excess alpha amylase then purified by flotation and screening until a clean fiber was obtained. Fine fiber (from the press-throughs) was decanted and classified until relatively starch free, boiled with excess alpha amylase, then washed on a 400 mesh screen. Clean substrates were dyed with crystal violet, bromocresol green or saffranine. Substrates were dried, ground and decanted until free of sand (used to grind). Excess dye was removed with acid and base washes until color could no longer be extracted.

Dyed substrates were incubated overnight at 50° C. in buffer with high concentrations of Genencor ® Cellulase, hemicellulase, or combinations. Samples of Saffranine dyed fiber incubated with cellulase or cellulase plus hemicellulase released dye into the buffer giving salmon colored buffer, indicative of enzymatic digestion. Nonenzymatic controls and hemicellulase alone gave colorless supernatents. No color was solubilized from crystal violet or bromocresol stained samples.

Microscopic observations showed these stains are selective in their binding (once excess color is removed with acid washing). Saffranine stained the pericarp giving two distinct colors. The inner granular pericarp layer stained salmon-tan, while the outer more tubular layer stained deep red. Cellulase attacks the granular layer only.

Staining of the fine fiber revealed this material is not representative of the bulk of the fiber. It contained a high percentage of a thin plate-like material that stained salmon with saffranine. This material was completely degraded by cellulase treatment. Materials stained with crystal violet and bromocresol green were not degraded by enzymatic treatment.

To summarize, corn fiber is highly resistant to enzymatic degradation. Specific fractions of the fiber, present as a small percent of the total, are relatively more susceptible to degradation, High enzyme concentrations were required to degrade all fractions except the thin-plate material.

These data suggest that use levels of cellulase as suggested herein will not degrade corn fiber to a measurable extent. Degradation of the thin-plate material might occur and could possibly result in measurably improved filtration rates through the gluten press.

These data also suggest that enzyme addition to the steeps is not the preferred point of addition, since the enzyme neither enters the corn nor is highly effective on the pericarp surface. Provided sufficient stability, cellulase added to the first mill would function in the wet mill and then be carried to the steeps where it might have some additional benefit.

IV Cellulase Stability in Steep Liquor

To 25 ml of steep liquor (pH 3.6, 936 ppm $SO_2$) was added 0.025 ml of Genencor ® Cellulase 150L. Diluted enzyme was incubated at 50° C. Samples were withdrawn hourly and residual enzyme activity measured. No loss in activity occurred within 10 hours.

Contrary to expectations, Genencor ® Cellulase 150L is remarkably stable to the harsh environment in which it was tested. It must be emphasized that the activity referred to here is CMC viscosity activity and is a measure of the "endo" acting hydrolytic component of this product. Conventional wisdom would state that the beta-glucosidase activity must surely be largely inactivated, though this was not measured.

V. Effect of Cellulase on Ground Steeped Corn

Corn collected from the first mill tank of a full size plant having a capacity of about 100 tons/day (150 gm aliquots diluted with 50 ml water) was incubated at 45° C. for 60 minutes with enzymes as indicated.
 a. control
 b. 0.010 ml Genencor ® Cellulase 150L
 c. 0.100 ml Genencor ® Cellulase 150L
 d. 0.100 ml Genencor ® Cellulase 150L plus 0.030 gm Hemicellulase (Sumizyme AC, Sumitomo Corp. Japan)

Differences in viscosity were apparent after incubation. The ease of stirring was rated as a,b,c,d with d being the easiest. Treated samples were then washed on a #16 mesh screen to remove free starch. Trials b, c, and d were equal in the amount of starch adhering. The control "a" sample had the greatest quantity of adhering starch. Furthermore, particles adhering to treated samples b,c and d could be more easily "picked off with a fingernail" than particles adhering to the control.

VI. Enzyme Activity through the Milling Process

Enzyme was added to steeped corn in a wet mill actively grinding about 4,000 Kg/hr of corn (see following results). Thirty-six hours after beginning addition of enzyme, and forty-eight hours after increasing the enzyme addition rate, activity profiles throughout the wet mill and steeps were measured. Sampling points are indicated and are listed below. Enzyme activities were measured on the liquid portion of samples after filtration. Fiber, germ and gluten samples were extracted with equal weights of water before filtering (values reported indicate activity in the original samples). Corrections have been applied for the volume occupied by insoluble solids. In the instance of the starch slurry which contained 39% starch solids, the true volumetric activity in the composite sample is considerably reduced when this correction is made. Activity values are relative. Standard enzyme diluted 1:10,000 has (by definition used) an activity of 100% under the assay conditions. Values may also be considered as ppm Genencor ® Cellulase 150L at standard activity.

| SAMPLE POINT | # | DS | 20 ML/MIN | 40 ML/MIN | 20 DSB | 40 DSB |
|---|---|---|---|---|---|---|
| FIRST GRIND | 1 | 12 | 233 | 601 | 205 | 529 |
| PROCESS WATER | 2 | 1 | 164 | 375 | 162 | 371 |
| MILL STARCH | 3 | 13 | 204 | 450 | 177 | 392 |
| SULFUR WATER | 4 | 1 | 136 | 287 | 135 | 284 |
| FINAL STEEP* | 5 | 6 | 104** | 407 | 98 | 383 |
| FIBER | 6 | 48 | 80 | 192 | 42 | 100 |
| GLUTEN CAKE | 7 | 53 | 50 | 162 | 24 | 76 |
| GERM PRESS | 8 | 48 | 18 | 50 | 9 | 26 |
| STARCH SLURRY | 9 | 39 | 6 | 16 | 4 | 10 |

*LIQUID SAMPLE WITHOUT CORN
**36 HOURS ARE INSUFFICIENT TO REACH EQUILIBRIUM
DS = Dry Solids
DSB = Dry Solids Basis, as indicated in specification.

These data confirm the stability of cellulase in the actual process. Activities decrease slowly as the cellulase works its way back through the process from first grind toward the steep. The large decrease in activity measured in the process water relative to the first grind tank, is largely due to dilution from incoming city water via the starch washing process. Another 20%–25% activity loss occurs in the sulfur tower and sulfur water hold tank. Although the values reported indicate 50% of the original activity reaches the steeps, the actual percentage is greater when corrected for dilution. and approaches 70%.

As seen in the laboratory, apparent enzyme activity increases during steeping. This was previously shown to result from concentration as water is drawn into the corn. Enzyme levels reported for the insoluble materials (germ, gluten and starch) are probably higher than actual since dry solid corrections apply to the weight of the solids and not to their volume. As reported, cellulase activity in the starch slurry (corrected for ds) is less than 2% of that measured in the first grind tank. No cellulase activity would exist after jet-cooking this starch.

Activities determined when dosing 40 ml/min of cellulase are roughly double those measured when dosing 20 ml/min. Small differences may be attributed to fluctuations in grind rate or in quantity of incoming city water in the hours prior to sample collection.

VII. Enzyme Clearance from Wet Mill

Enzyme activity was measured in the process water hourly after termination of enzyme addition to determine clearance rates from the wet mill. Data shows the affects of gradual dilution by incoming city water. The residence "space time" for the wet mill process water can be calculated assuming back-mix dynamics using the formula:

$$CLEARANCE = 1 - e^{(T/t)}$$
WHERE
$T$ = TIME OF MIXING
$t$ = REACTOR SPACE TIME

Thus when T=t, 63.2% of the enzyme will have cleared the system. From the data presented in FIG. 1, the space time is found to be approximately 9 hours. This equation predicts that less than 7% of the original activity will remain in the process water after 24 hours. Although not monitored, enzyme clearance from the steeps would logically lag behind clearance from the mill house by about 24 hours (20 hours in steeps plus 4 hours in sulfur water tank).

The "return to baseline" time period was closely monitored to determine if the improvements obtained by enzyme use disappeared with clearance from the mill house. A slower, or biphasic return to baseline would be an indication of beneficial enzyme performance in the steeps as well as in the mill.

Return to baseline data shows "bound starch in fiber" increased within hours of halting enzyme addition.

Results

The following Table 1 shows the results of the trials in an operating corn mill using the above process. As can be seen, daily grind increased 12.8%, starch in fiber fell 21.3% and bound starch in fiber fell 52.29%. This was accomplished while other parameters were statistically unchanged. Without addition of cellulase, steeping time could be reduced to 21 hours. However, absolute starch in fiber and bound starch increased significantly (10.8% and 8.5% respectively). Addition of cellulase to the grain brought parameters to normal levels with only 19 hours of steeping.

TABLE 1

DATA SUMMARY

TEST RESULTS (BEFORE, DURING AND AFTER ADDITION OF GENENCOR CELLULASE 150L)

| TEST PARAMETER | AVERAGES | | | STANDARD DEVIATION | | |
|---|---|---|---|---|---|---|
| | BEFORE | ENZYME | AFTER | BEFORE | ENZYME | AFTER |
| STEEP TIME (HRS) | 21.1 | 19.1 | 20.0 | 1.99 | 1.05 | 0.00 |
| GRIND (T/DAY) | 94 | 106 | 103 | 26.3 | 15.4 | 5.4 |
| ENZYME, MLS/MIN | NONE | 29.0 | NONE | | 11.6 | |
| ENZYME (ML/T) | | 399 (*) | | | 102 | |
| FIBER ANALYSIS | | | | | | |
| MOISTURE, FIBER | 62.1 | 62.9 | 63.9 | 2.85 | 3.24 | 3.09 |
| STARCH IN FIBER | 26.8 | 21.1 | 21.1 | 6.37 | 4.07 | 2.32 |
| BOUND STARCH IN FIBER | 18.4 | 8.80 | 11.1 | 5.47 | 2.85 | 1.87 |
| STARCH ANALYSIS | | | | | | |
| TOTAL PROTEIN IN STARCH | 0.37 | 0.37 | 0.53 | 0.07 | 0.07 | 0.09 |
| SOL PROTEIN IN STARCH | 0.02 | 0.01 | 0.02 | | | |
| pH OF STARCH SLURRY | 3.48 | 3.45 | 3.65 | 0.27 | 0.17 | 0.57 |
| Be' OF STARCH SLURRY | 21.2 | 21.5 | 21.3 | 0.51 | 0.30 | 0.33 |
| SOLUBLES IN STARCH | 0.08 | 0.05 | 0.04 | 0.02 | 0.02 | 0.02 |
| FINE FIBER IN STARCH | 1149 | 1086 | 1061 | 448 | 221 | 114 |
| SCOTT VISCOSITY | 71.5 | 74.5 | NA | 3.47 | 0.5 | NA |
| GERM ANALYSIS | | | | | | |
| OIL IN GERM (DSB) | 47.4 | 44.8 | 45.5 | 5.43 | 4.02 | 3.87 |
| STARCH IN GERM | 11.6 | 8.46 | 9.18 | 2.15 | 2.39 | 2.21 |
| MOIST IN PRESSED GERM | 51.6 | 53.1 | 54.0 | 2.76 | 2.42 | 1.91 |
| BE OF 1ST GRIND TANK | 6.25 | 5.21 | 5.68 | 1.29 | 0.85 | 0.79 |
| MUD CENTRIFUGE OPER. | | | | | | |
| PROTEIN, MUD CENT OVERS | 20.9 | 20.1 | 25.1 | 5.33 | 3.15 | 2.12 |
| DS IN MUD CENT OVERS | 67.3 | 68.9 | 71.5 | 9.06 | 4.87 | 4.20 |
| OIL IN MUD CENT OVERS | 54.5 | 50.1 | 54.4 | 4.00 | 9.24 | 1.30 |
| MISC. | | | | | | |
| MOISTURE IN GLUTEN CAKE | 51.7 | 51.6 | 52.6 | 3.83 | 4.19 | 2.16 |
| OIL IN GLUTEN MEAL | 3.76 | 4.84 | 2.42 | 1.99 | 1.88 | 1.06 |
| INSOLUBLES, PROCESS WATER | 0.36 | 0.40 | 0.63 | 0.11 | 0.15 | 0.26 |
| PROTEIN, PRIMARY SEP. | 74.5 | 75.1 | 75.3 | 7.53 | 5.16 | 4.45 |
| AMPS OF ENTOLITER | 125 | 124 | 128 | 6.87 | 5.08 | 4.02 |
| MOIST, CORN AFTER STEEPS | 41.7 | 43.0 | 42.1 | 2.50 | 2.52 | 1.84 |
| BE' OF FINAL STEEP | 2.58 | 2.88 | 3.25 | 0.52 | 0.58 | 0.80 |
| VISC. OF FINAL STEEP | 0.72 | 0.66 | NA | 0.07 | 0.03 | NA |
| VISC. OF LT STEEP WATER | 0.66 | 0.63 | NA | 0.02 | 0.03 | NA |

| | TEST RESULTS AT HIGH AND LOW ENZYME DOSING | | | | HISTORICAL DATA JANUARY, 1987 | |
|---|---|---|---|---|---|---|
| | 40 ML/MIN HIGH ENZYME | | 20 ML/MIN LOW ENZYME | | | |
| TEST PARAMETER | AVE. | STD. DEV. | AVE. | STD. DEV. | AVE. | STD. DEV. |
| STEEP TIME (HRS) | 19.1 | 1.03 | 19.0 | 1.12 | 36.3 | |
| GRIND (T/DAY) | 109 | 1.00 | 104 | 19.6 | 100 | |
| ENZYME, MLS/MIN | 40 | | 20 | | NONE | |
| ENZYME (ML/T) | | | | | | |
| FIBER ANALYSIS | | | | | | |
| MOISTURE, FIBER | 62.9 | 1.73 | 62.6 | 4.12 | 63.0 | 1.30 |
| STARCH IN FIBER | 20.0 | 4.44 | 22.0 | 2.74 | 16.0 | 2.70 |
| BOUND STARCH IN FIBER | 7.18 | 2.46 | 10.3 | 1.60 | 9.90 | 0.60 |
| STARCH ANALYSIS | | | | | | |
| TOTAL PROTEIN IN STARCH | 0.39 | 0.02 | 0.35 | 0.09 | 0.45 | 0.10 |
| SOL PROTEIN IN STARCH | 0.01 | | 0.01 | | 0.01 | |
| pH OF STARCH SLURRY | 3.47 | 0.19 | 3.43 | 0.16 | 3.30 | 0.20 |
| BE' OF STARCH SLURRY | 21.4 | 0.28 | 21.6 | 0.31 | 22.0 | 0.30 |
| SOLUBLES IN STARCH | 0.06 | 0.02 | 0.04 | 0.00 | | |
| FINE FIBER IN STARCH | 983 | 182 | 1171 | 225 | 1435 | 409 |
| SCOTT VISCOSITY | NA | NA | 74.5 | 0.5 | | |
| GERM ANALYSIS | | | | | | |
| OIL IN GERM (DSB) | 44.8 | 2.77 | 46.1 | 3.20 | 46.2 | 0.10 |
| STARCH IN GERM | 7.66 | 0.23 | 8.45 | 2.77 | | |
| MOIST IN PRESSED GERM | 54.6 | 1.18 | 51.9 | 2.64 | 53.6 | 2.40 |
| BE OF 1ST GRIND TANK | 5.38 | 0.79 | 4.97 | 0.85 | 6.70 | 1.20 |
| MUD CENTRIFUGE OPER. | | | | | | |
| PROTEIN, MUD CENT OVERS | 19.2 | 0.49 | 21.4 | 4.65 | | |
| DS IN MUD CENT OVERS | 69.4 | 5.53 | 68.5 | 4.05 | | |
| OIL IN MUD CENT OVERS | 48.4 | 8.75 | 51.3 | 9.38 | | |
| MISC. | | | | | | |
| MOISTURE IN GLUTEN CAKE | 53.8 | 1.27 | 49.0 | 4.40 | | |
| OIL IN GLUTEN MEAL | 3.24 | 1.17 | 5.81 | 1.61 | 3.80 | 0.00 |
| INSOLUBLES, PROCESS WATER | 0.52 | 0.15 | 0.30 | 0.07 | | |
| PROTEIN, PRIMARY SEP. | 75.7 | 4.54 | 76.4 | 4.52 | | |
| AMPS OF ENTOLITER | 129 | 1.92 | 121 | 1.26 | | |

TABLE 1-continued

| DATA SUMMARY | | | | | | |
|---|---|---|---|---|---|---|
| MOIST, CORN AFTER STEEPS | 44.1 | 1.59 | 43.2 | 1.19 | | |
| BE' OF FINAL STEEP | 3.1 | 0.69 | 2.71 | 0.43 | 3.30 | 0.60 |
| VISC. OF FINAL STEEP | 0.65 | 0.02 | 0.67 | 0.03 | | |
| VISC. OF LT STEEP WATER | 0.62 | 0.00 | 0.64 | 0.04 | | |

What is claimed is:

1. A composition consisting essentially of a steeped starch-containing grain and a cellulase enzyme in a concentration from at least about 5000 F.P.U./ton of steeped grain to about 60,000 F.P.U./ton of steeped grain.

* * * * *